(12) United States Patent
Bagepalli et al.

(10) Patent No.: US 7,608,939 B2
(45) Date of Patent: Oct. 27, 2009

(54) METHODS AND APPARATUS FOR ASSEMBLING AND OPERATING MONOCOQUE ROTARY MACHINES

(75) Inventors: Bharat Sampathkumaran Bagepalli, Niskayuna, NY (US); Peter Rogall, Emsbüren (DE); James Patrick Francis Lyons, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 462 days.

(21) Appl. No.: 11/619,722

(22) Filed: Jan. 4, 2007

(65) Prior Publication Data

US 2008/0164700 A1    Jul. 10, 2008

(51) Int. Cl.
*H02P 9/00* (2006.01)

(52) U.S. Cl. .............................. 290/55; 290/43; 290/42; 290/54; 290/44

(58) Field of Classification Search .................. 290/42, 290/43, 44, 54, 55
See application file for complete search history.

(56) References Cited

U.S. PATENT DOCUMENTS

| | | | |
|---|---|---|---|
| 5,890,783 A | 4/1999 | Babcock et al. | |
| 6,227,131 B1 | 5/2001 | Strong et al. | |
| 6,951,443 B1 | 10/2005 | Blakemore | |
| 7,042,109 B2 | 5/2006 | Gabrys | |
| 7,453,164 B2 * | 11/2008 | Borden et al. | 290/42 |
| 7,498,685 B2 * | 3/2009 | Turner | 290/53 |
| 2005/0019166 A1 | 1/2005 | Bervang | |
| 2005/0230979 A1 | 10/2005 | Bywaters et al. | |
| 2006/0213145 A1 | 9/2006 | Haller | |
| 2006/0220389 A1 | 10/2006 | Shibata et al. | |
| 2006/0225278 A1 | 10/2006 | Lin et al. | |
| 2007/0025856 A1 | 2/2007 | Moroz | |

* cited by examiner

*Primary Examiner*—Nicholas Ponomarenko
*Assistant Examiner*—Iraj A Mohandesi
(74) *Attorney, Agent, or Firm*—James McGinness, Esq.; Armstron Teasdale LLP

(57) ABSTRACT

A method and apparatus of assembling a rotary machine includes providing at least one component. The component is at least one of a rotating member and a stationary member. The method and apparatus also includes coupling the component to a monocoque nacelle structure. The monocoque nacelle structure includes an outer shell that extends over at least a portion of the component.

18 Claims, 5 Drawing Sheets

METHODS AND APPARATUS FOR ASSEMBLING AND OPERATING MONOCOQUE ROTARY MACHINES

BACKGROUND OF THE INVENTION

This invention relates generally to rotary machines and more particularly, to methods and apparatus for assembling and operating wind turbine nacelles.

At least some known wind turbine generators ("wind turbines") include a rotor having multiple blades. The blades are coupled to a rotatable hub to facilitate transforming mechanical wind energy into a mechanical rotational torque that drives one or more generators. Although some known wind turbines include gearless direct drive generators, known wind turbines generally include generators that are rotationally coupled to the rotor through a gearbox. The gearbox facilitates increasing an inherently low rotational speed of the turbine rotor. The generator uses the rotational speed to facilitate efficiently converting the rotational mechanical energy to electrical energy, which is fed into a utility grid.

In known wind turbines including a gearbox, the rotor, generator, gearbox and other wind turbine components are typically mounted on a load-bearing bed frame within a housing, or nacelle that is positioned on top of a base that may be a truss or tubular tower. Because the wind turbine components are mounted on the load-bearing bed frame, an outer shell or external skin of the nacelle serves as a non-load bearing protective skin that may be formed as a heavy casting. Therefore, some known nacelle configurations introduce substantial weight at the top of the wind turbine tower to facilitate supporting the wind turbine components positioned within. Further, any associated component supporting features of some known nacelles also facilitate increasing weight at the top of the wind turbine tower. As a result of increased weight, some known nacelles facilitate increasing capital and operational costs of the wind turbine.

BRIEF DESCRIPTION OF THE INVENTION

In one aspect, a method for assembling a rotary machine is provided. The method includes providing at least one component. The component is at least one of a rotating member and a stationary member. The method also includes coupling the component to a monocoque nacelle structure. The monocoque nacelle structure includes an outer shell that extends over at least a portion of the component.

In another aspect, a wind turbine generator is provided. The wind turbine generator includes at least one component. The component includes at least one of a rotating member and a stationary member. The wind turbine generator also includes a monocoque nacelle structure coupled to the component. The monocoque nacelle structure includes an outer shell extending over at least a portion of the component.

In a further aspect, a monocoque nacelle for a rotary machine is provided. The monocoque structure includes at least one component. The component includes at least one of a rotating member and a stationary member. The monocoque nacelle also includes an outer shell coupled to the component. The outer shell extends over at least a portion of the component.

DETAILED DESCRIPTION OF THE INVENTION

The exemplary methods and apparatus described herein overcome the structural disadvantages of known nacelles by providing a monocoque nacelle structure. It should be appreciated that "monocoque" is used throughout this application to refer to a structure that is configured to use a thin outer shell, or external skin, to support a substantial portion of the overall mechanical weight and stress loading of components coupled thereon. More specifically, it should be appreciated that "monocoque nacelle" is used throughout this application to refer to a nacelle structure that is configured to use an outer shell, or external skin, to support a substantial portion of the overall mechanical weight and stress loading of wind turbine components coupled thereon. In one exemplary embodiment, the outer shell is a thin outer shell with little to no internal support features such as, but not limited to, a load-bearing bed frame positioned within the shell.

Figure 1:
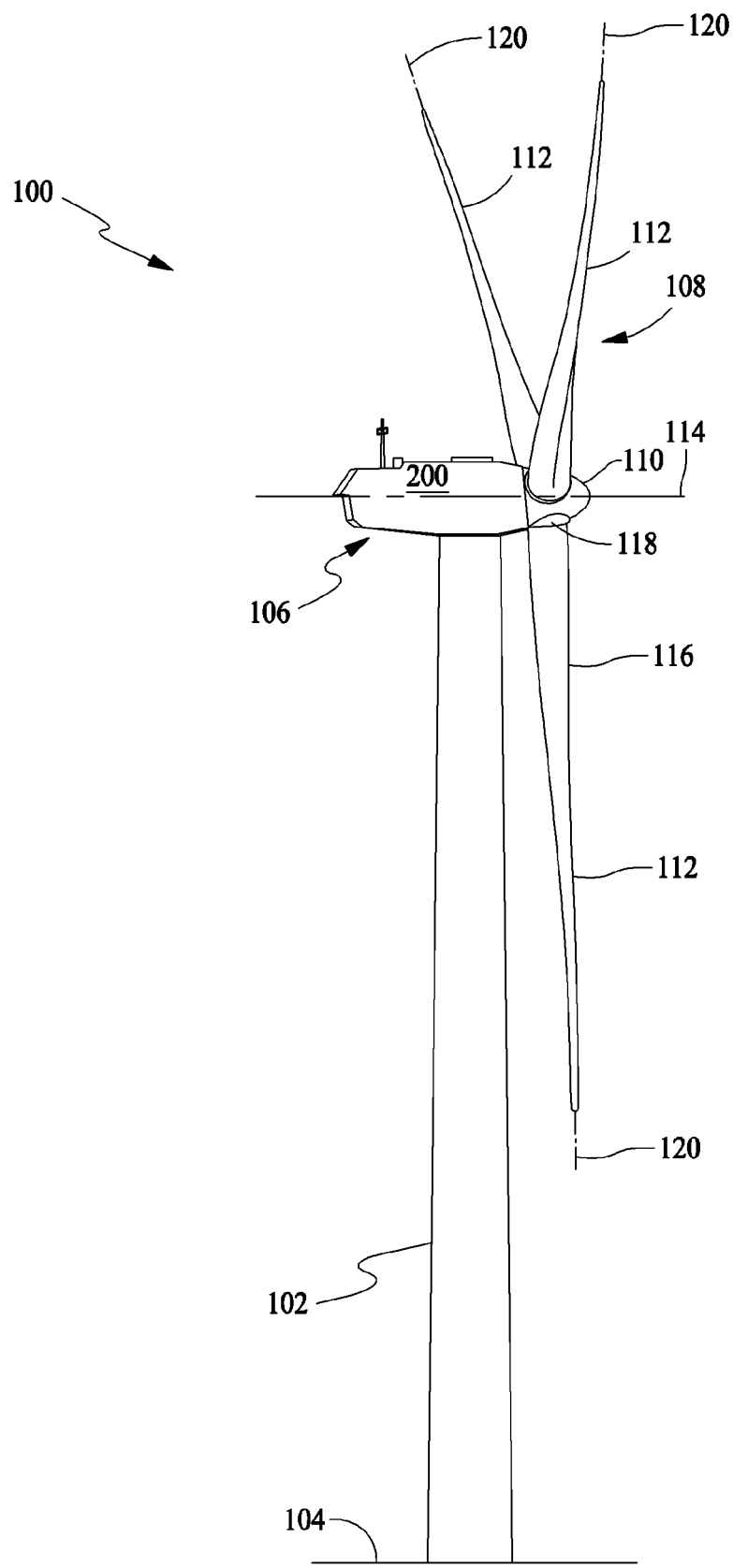
FIG. 1 is a schematic illustration of an exemplary wind turbine generator including a nacelle.

FIG. 1 is a schematic illustration of an exemplary wind turbine generator 100. In the exemplary embodiment, wind turbine generator ("wind turbine") 100 is a horizontal axis wind turbine. Alternatively, wind turbine 100 may be a vertical axis wind turbine. Wind turbine 100 includes a tower 102 erected on a supporting surface 104, a monocoque nacelle 106 coupled to tower 102, and a rotor 108 coupled to nacelle 106. Rotor 108 includes a rotatable hub 110 and a plurality of rotor blades 112 coupled to hub 110. In the exemplary embodiment, tower 102 is fabricated from tubular steel and includes a cavity (not shown) extending between supporting surface 104 and nacelle 106. In an alternative embodiment, tower 102 is a lattice tower. The height of tower 102 is selected based upon factors and conditions known in the art. In the exemplary embodiment, rotor 108 includes three rotor blades 112. In an alternative embodiment, rotor 108 may include more or less than three rotor blades 112.

In the exemplary embodiment, blades 112 have a length between 50 meters (m) (164 feet (ft)) and 100 m (328 ft). Alternatively, blades 112 may have any length. Blades 112 are connected to rotor hub 110 to facilitate rotating rotor 108 about a central rotational axis 114 to transfer kinetic energy from the wind into usable mechanical energy, and subsequently, electrical energy. More specifically, blades 112 are mated to hub 110 by coupling a blade root portion 116 of each blade 112 to a plurality of load transfer regions 118 on hub 110. Load transfer regions 118 include a hub load transfer region (not shown) and a blade load transfer region (not shown). Loads generated by blades 112 are transferred to hub 110 via load transfer regions 118.

During operation of wind turbine 100, wind strikes blades 112 to facilitate rotation of blades 112. As blades 112 are rotated, blades 112 are subjected to centrifugal forces, various bending moments, and/or other operational stresses. As such, blades 112 may deflect and/or rotate from a neutral, or non-deflected, position to a deflected position. Therefore, blades 112 may be subjected to associated stresses and/or loads. Moreover, a pitch angle of blades 112, i.e., the angle that determines a perspective of blades 112 with respect to the direction of the wind, may be changed by a pitch adjustment mechanism (not shown) that rotates the blades about a pitch axis 120. Specifically, the pitch adjustment mechanism facilitates increasing or decreasing blade 112 speed by adjusting the surface area of blades 112 exposed to wind force vectors. In the exemplary embodiment, the pitches of blades 112 are controlled individually. Alternatively, the pitch of blades 112 may be controlled as a group.

In some configurations, one or more microcontrollers in a control system (not shown) are used for overall system monitoring and control including pitch and rotor speed regulation, yaw drive and yaw brake application, and fault monitoring. Alternatively, distributed or centralized control architectures are used in alternate embodiments of wind turbine 100.

Figure 2:
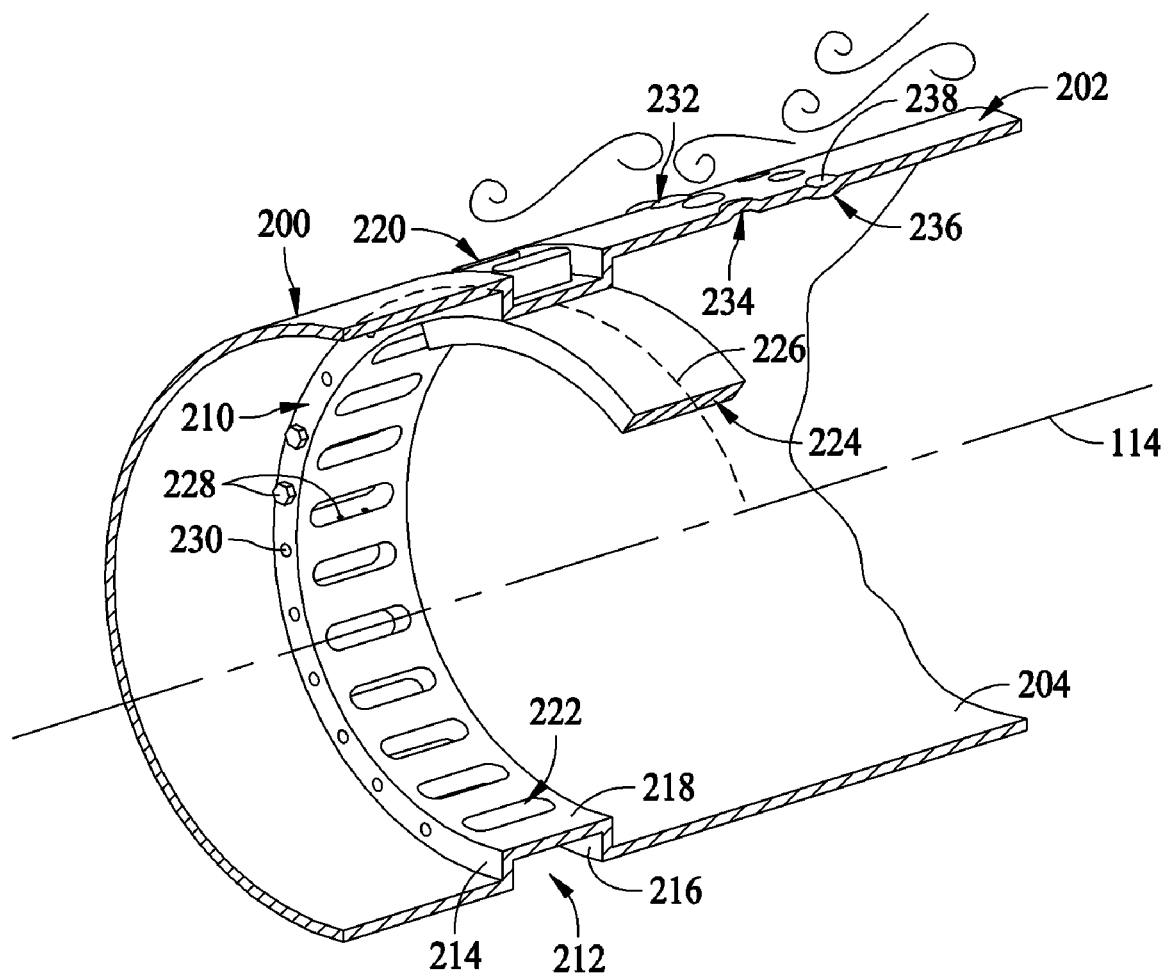
FIG. 2 is a fragmentary cross-sectional axially skewed schematic view of an outer shell of a monocoque nacelle shown in FIG. 1.

FIG. 2 is a fragmentary cross-sectional axially skewed schematic view of an outer shell 200 of monocoque nacelle 106 (shown in FIG. 1). More specifically, in the exemplary embodiment, outer shell 200 is a thin, load-bearing shell that includes an outer surface 202, an inner surface 204, and a stamped mounting portion 210.

Outer shell 200 is fabricated from sheets of sturdy, light-weight material such as, but not limited to, aluminum alloys, fiber-reinforced composites or any other materials that facilitate attaining predetermined operational parameters. Operational parameters include, but are not limited to, facilitation of mitigating weight loads at the top of tower 102 (shown in FIG. 1), providing sufficient material strength to withstand local environmental conditions, and collecting and distributing weight and stress loadings from wind turbine components positioned within nacelle 106.

In the exemplary embodiment, the sheets of material are assembled to form outer shell 200 via retention hardware methods that include, but are not limited to, riveting and bolting. Alternatively, welding methods are used to couple the sheets of material. In a further alternative, outer shell 200 is fabricated, cast or forged as a unitary member that adheres to the aforementioned operational parameters.

Prior to assembly of outer shell 200, at least one sheet of material forming outer shell 200 is stamped to form mounting portion 210 therein such that concave/convex portions of outer surface 202 conform to respective concave/convex portions of inner surface 204. Mounting portion 210 includes an inwardly protruding channel 212 that is defined by a first wall 214, a second wall 216, and an intermediate wall 218 positioned therebetween. First wall 214 and second wall 216 are substantially parallel walls that are perpendicular to and project inward towards central rotational axis 114. In the exemplary embodiment, channel 212 is circumferentially arranged about central rotational axis 114. Alternatively, channel 212 may vary in size, shape, and/or orientation without departing from the scope of the present application.

Mounting portion 210 also includes a plurality of spaced projections 220 defined within channel 212. More specifically, projections 220 protrude outwardly from intermediate wall 218 of channel 212. Each projection 220 includes a recessed cavity 222 opening towards central rotational axis 114. It should be appreciated that projections 220 may vary in size, shape, and/or orientation without departing from the scope of the present application. As a result of stamped mounting portion 210, numerous wind turbine components positioned within outer shell 200 are directly coupled to outer shell 200 via mounting portion 210.

For example, as illustrated in FIG. 2, a bearing 224 is directly coupled to intermediate wall 218 along a central co-axial circumferential axis 226 of bearing 224 and intermediate wall 218. Alternatively, other wind turbine components may be directly coupled to outer shell 200 by, for example, welding methods and/or inserting a plurality of fasteners 228 through openings 230 defined in mounting portions such as, but not limited to, first wall 214, second wall 216, projections 220, and/or other portions of outer shell 200. As a result, mounting portion 210 facilitates easier assembly, less wear, and/or more simple repair as compared to known nacelle structures because rivets and fasteners can be easily inserted and/or removed to mount and/or replace wind turbine components provided within outer shell 200.

In the exemplary embodiment, outer shell 200 of monocoque nacelle 106 is fabricated from thinner sheets of work hardened metals as compared to outer shells of known nacelles including semi-monocoque nacelles. Such work hardened metals may include, but are not limited to, certain types of aluminum with an "H" suffix. More specifically, stamping work hardened materials facilitates increasing the strength of sheet materials as compared to sheet materials that are not stamped. Therefore, the portion of outer shell 200 that includes stamped mounting portion 210 therein is stronger as compared to portions of outer shell 200 that do not include mounting portion 210. For example, fatigue in stamped mounting portion 210 is more evenly distributed and thus causes less damage in stamped mounting portion 210 than in a non-stamped portion of outer shell 200. Therefore, mounting portion 210 includes a torsional rigidity that facilitates reduced twisting of outer shell 200. As a result, internal wind turbine components can operate more efficiently.

Moreover, mounting portion 210 facilitates directly disseminating stresses and loads of mounted wind turbine components into outer shell 200, and such wind turbine components may be directly mounted to outer shell 200. As set forth in the exemplary embodiment, monocoque nacelle 106 facilitates reducing vibration stresses and reducing a number of structural members required for strength and rigidity to support such stresses and loads without the assistance of additional internal support members and/or load-bearing support frames. In addition, outer shell 200 is a high-energy absorption body including strong mounting portion 210, and accordingly, monocoque nacelle 106 does not require an internal framework for structural strength, mounting wind turbine components therein, and/or transferring loads of such wind turbine components. As such, in the exemplary embodiment, monocoque nacelle 106 does not include a load-bearing bed frame.

Mounting portion 210 also facilitates fabricating nacelle 106 from thinner sheets of material as compared to known nacelle structures, such as semi-monocoque nacelle structures. More specifically, instead of providing thicker sheets of material for mounting strength and/or rigidity, thinner sheets of material may be stamped to form stamped mounting portion 210 at various locations in outer shell 200 where component mounting strength and/or rigidity are desirable. As such, mounting strength and/or rigidity is facilitated by providing thinner, lighter weight materials including bent/stamped mounting portions.

Although monocoque nacelle 106 is fabricated from thinner sheets of material, monocoque nacelle 106 facilitates absorbing deflections and vibrations experienced by outer shell 200 and facilitates protecting wind turbine components positioned within outer shell 200. Because thinner sheets of material are generally lighter in weight as compared to thicker sheets of a same material, monocoque nacelle 106 also facilitates reducing weight and material costs as compared to at least some known nacelles. Therefore, monocoque nacelle 106 is generally stronger, lighter, more durable, and more load and stress absorbing as compared to at least some known nacelles.

In the exemplary embodiment, at least one sheet of material forming outer shell 200 is stamped to form a plurality of outwardly projecting dimples 232 therein such that concave/convex portions of outer surface 202 conform to respective concave/convex portions of inner surface 204. Each outwardly projecting dimple 232 forms a recessed cavity 234 extending away from central rotational axis 114. At least one sheet of material forming outer shell 200 is also stamped to form a plurality of inwardly projecting dimples 236 therein such that concave/convex portions of outer surface 202 conform to respective concave/convex portions of inner surface 204. Each inwardly projecting dimple 236 includes a recessed cavity 238 extending toward central rotational axis 114. It should be appreciated that dimples 232 and 236 may vary in size, shape, and/or orientation without departing from the scope of the present application.

As discussed above, at least one sheet of material forming outer shell 200 is stamped to form dimples 232 and 236, mounting portion 210, and/or projections 220. As a result, dimples 232 and 236, mounting portion 210, and/or projections 220 may provide additional surface area for outer shell 200. Therefore, at least some stamped portions of outer shell 200 may facilitate conduction of cooling air/wind for cooling wind turbine components positioned within outer shell 200.

Figure 3:
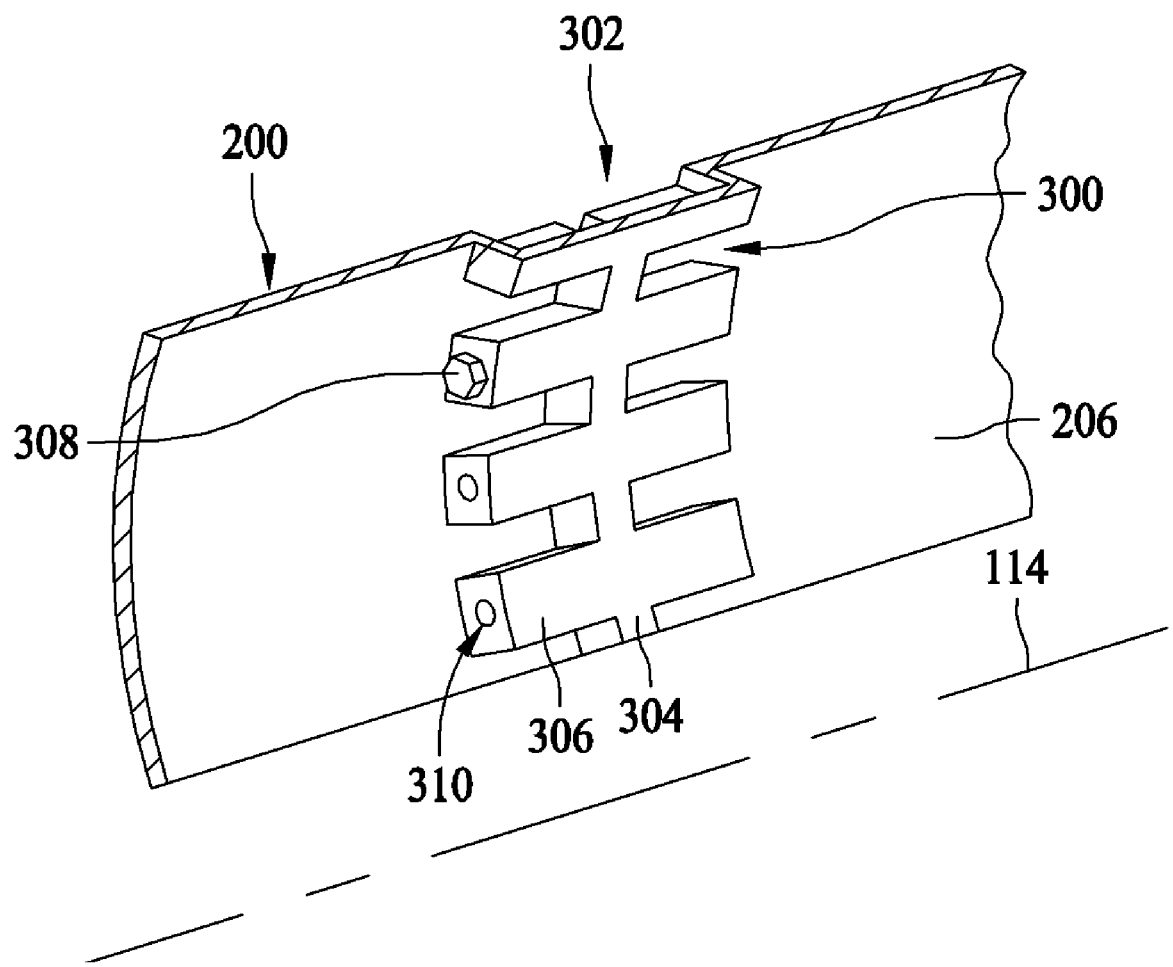
FIG. 3 is an enlarged fragmentary cross-sectional schematic view of an alternative stamped mounting portion that can be formed into the outer shell shown in FIG. 2.

FIG. 3 is an enlarged fragmentary schematic view of an alternative stamped mounting portion 300 that can be formed into outer shell 200 (shown in FIG. 2). Prior to assembly of outer shell 200, at least one sheet of material forming outer shell 200 is stamped to form mounting portion 300 therein such that concave/convex portions of outer surface 202 conform to concave/convex portions of inner surface 204. Mounting portion 300 includes a channel 302 that is defined by an inwardly protruding spine 304 and a plurality of inwardly protruding rib portions 306 extending therefrom. In the exemplary embodiment, channel 302 is circumferentially arranged about central rotational axis 114. Alternatively, channel 302 may vary in size, shape, and/or orientation without departing from the scope of the present application.

As a result of stamped mounting portion 300, numerous wind turbine components positioned within outer shell 200 are directly coupled to outer shell 200 via mounting portion 300. For example, wind turbine components are directly coupled to outer shell 200 by, for example, welding methods and/or inserting a plurality of fasteners 308 through openings 310 defined in mounting portion 300 and/or other outer shell 200 portions. As a result, mounting portion 300 facilitates easier assembly, less wear, simpler repair as compared to known nacelle structures because rivets and fasteners can be easily inserted and/or removed to mount and/or replace wind turbine components provided within outer shell 200. Moreover, stamped mounting portion 300 also facilitates providing the advantages discussed above with respect to increasing strength, disseminating stresses and loads, reducing vibration stresses, reducing a number of structural members, reducing an overall weight, and/or increasing surface area of outer shell 200 as compared to known nacelle structures.

Figure 4:
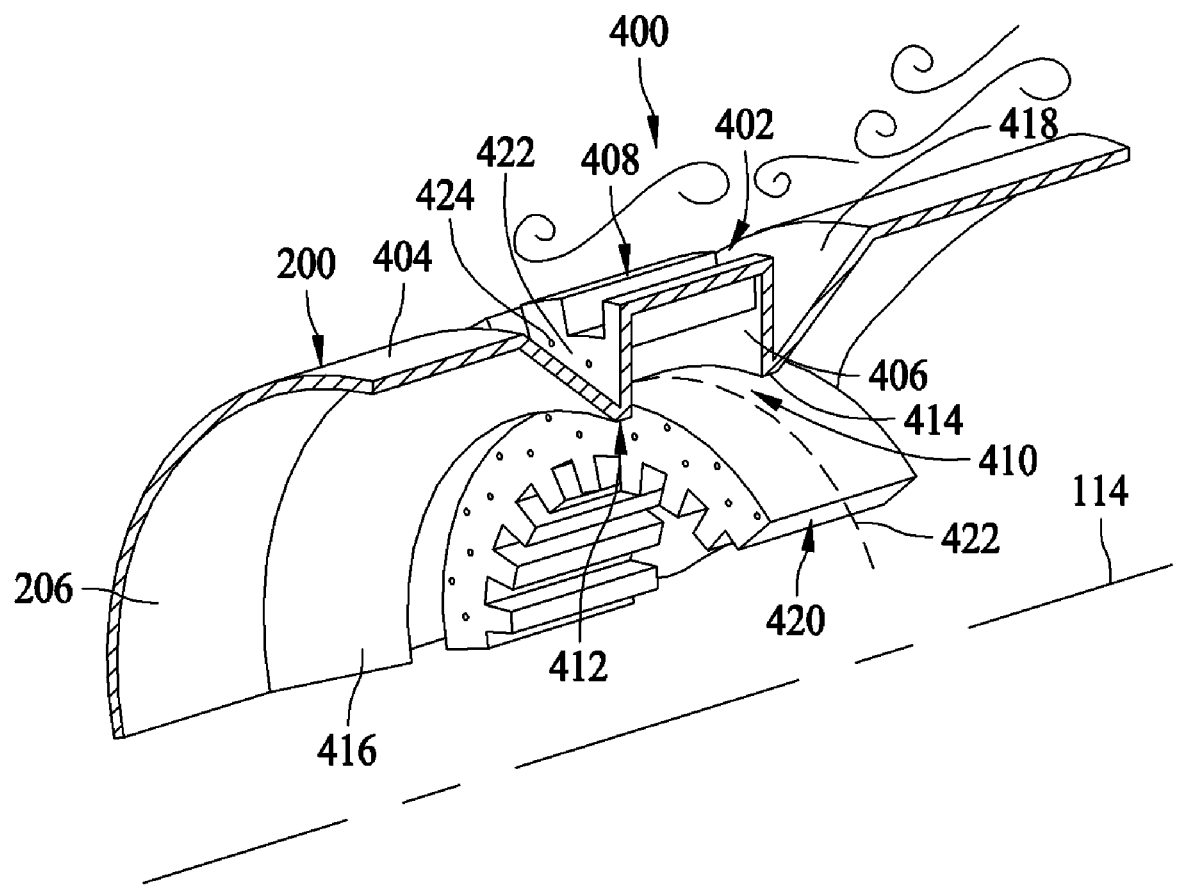
FIG. 4 is an enlarged fragmentary schematic view of another alternative stamped mounting portion that can be formed into the outer shell shown in FIG. 2.

FIG. 4 is an enlarged fragmentary schematic view of another alternative stamped mounting portion 400 that can be formed into outer shell 200 (shown in FIG. 2). Prior to assembly of outer shell 200, at least one sheet forming material forming outer shell 200 is stamped to form mounting portion 400 therein such that concave/convex portions of outer surface 202 conform to concave/convex portions of inner surface 204. Mounting portion 400 includes a first channel 402 that is defined by a first wall 404 and a substantially parallel second wall 406 that are perpendicular to and project inward towards central rotational axis 114. In the exemplary embodiment, first channel 402 is circumferentially arranged about central rotational axis 114. Alternatively, first channel 402 may vary in size, shape, and/or orientation without departing from the scope of the present application.

Mounting portion 400 also includes a plurality of spaced projections 408 defined within first channel 402. Each projection 408 includes a recessed cavity 410 opening towards central rotational axis 114. It should be appreciated that projections 408 may vary in size, shape, and/or orientation without departing from the scope of the present application.

Mounting portion 400 also includes a plurality of spaced, inwardly protruding v-shaped channels 412 and 414. V-shaped channel 412 is partially defined by first wall 404 and an obliquely angled third wall 416. V-shaped channel 414 is partially defined by second wall 406 and an obliquely angled fourth wall 418. In the exemplary embodiment, v-shaped channels 412 and 414 are disposed on opposite sides of projections 408. As a result, v-shaped channels 412 and 414 facilitate increasing the stiffness of outer shell 200. Moreover, v-shaped channels 412 and 414 each include a recessed cavity opening away from central rotational axis 114. It should be appreciated that v-shaped channels 412 and 414 may vary in size, shape, and/or orientation without departing from the scope of the present application.

As a result of stamped mounting portion 400, numerous components positioned within outer shell 200 may be directly coupled to outer shell 200 via mounting portion 400. For example, in the exemplary embodiment, stacked laminations of a stator core 420 may be directly coupled to first and second walls 404 and 406 along a central co-axial circumferential axis 422 of stator core 420 and first channel 402. Alternatively, other wind turbine components may be directly coupled to outer shell 200 by, for example, welding methods and/or inserting a plurality of fasteners (not shown) through openings 424 provided in other mounting portions such as, but not limited to, first wall 404, second wall 406, projections 408, and/or other outer shell 200 portions. As a result, mounting portion 400 facilitates easier assembly, less wear, simpler repair as compared to known nacelle structures because rivets and fasteners can be easily inserted and/or removed to mount and/or replace wind turbine components provided within outer shell 200. Moreover, stamped mounting portion 400 also facilitates providing the advantages discussed above with respect to increasing strength, disseminating stresses and loads, reducing vibration stresses, reducing a number of structural members, reducing an overall weight, and/or increasing surface area of outer shell 200 as compared to known nacelle structures.

Figure 5:
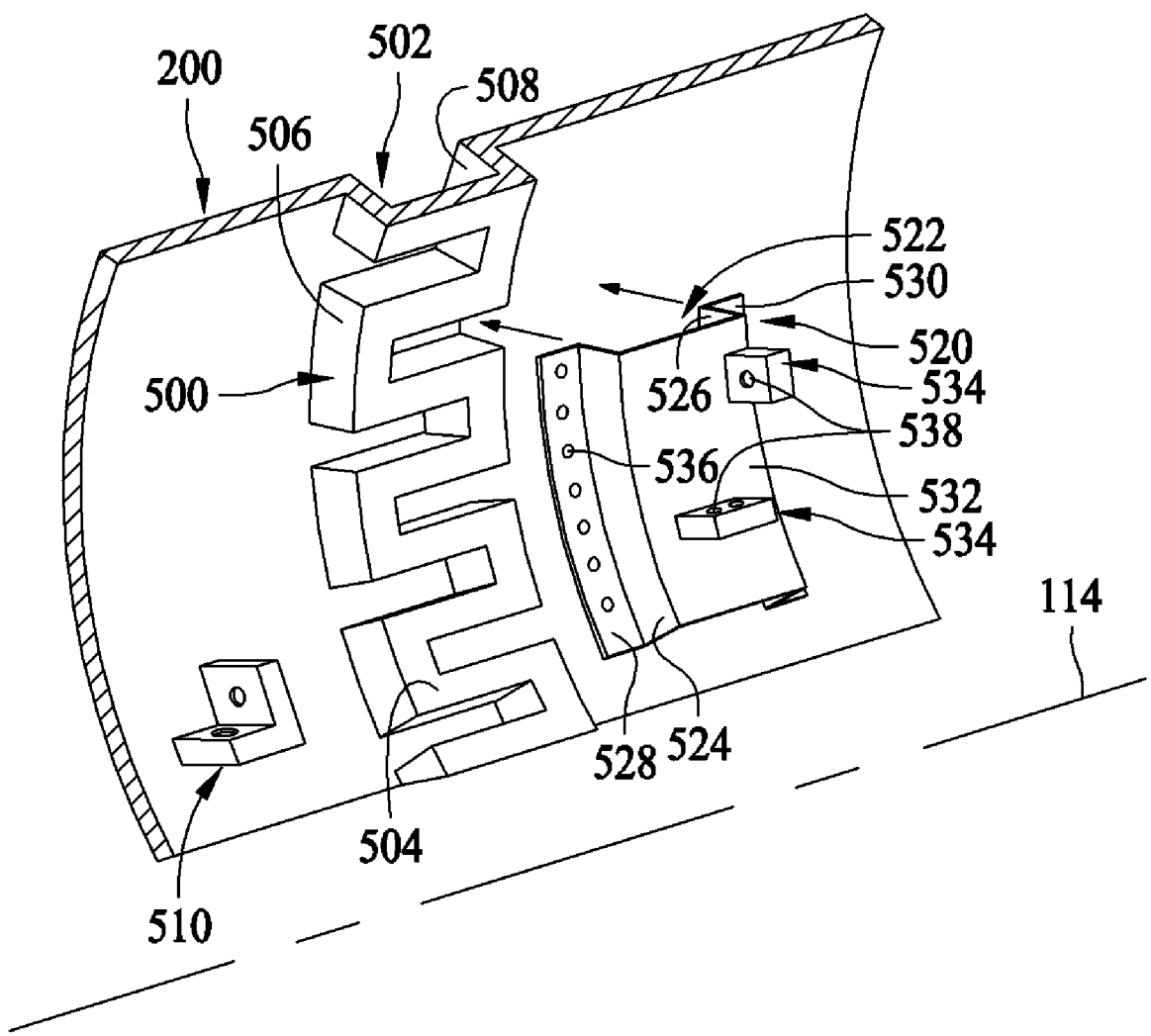
FIG. 5 is an enlarged fragmentary schematic view of further alternative stamped mounting portions that may be formed into and used with the outer shell shown in FIG. 2.

FIG. 5 is an enlarged fragmentary schematic view of further alternative stamped mounting portions that may be formed into and used with outer shell 200 (shown in FIG. 2). Prior to assembly of outer shell 200, at least one sheet of material forming outer shell 200 is stamped to form mounting portion 500 such that concave/convex portions of outer surface 202 conform to concave/convex portions of inner surface 204. Mounting portion 500 includes a channel 502 that is defined by an undulating projection 504 having a first wall 506 and a substantially parallel second wall 508. In the exemplary embodiment, channel 502 is circumferentially arranged about central rotational axis 114. Alternatively, channel 502 may vary in size, shape, and/or orientation without departing from the scope of the present application. In the exemplary embodiment, at least one sheet of material forming outer shell 200 is also stamped to form a spaced mounting blister 510.

As a result of stamped mounting portion 500 and/or stamped mounting blister 510, numerous components positioned within outer shell 200 may be directly coupled to outer shell 200 via mounting portion 500 and/or mounting blister 510. For example, wind turbine components may be directly coupled to outer shell 200 by, for example, welding methods and/or inserting a plurality of fasteners (not shown) through openings (not shown) defined in mounting portion 500, mounting blister 510, and/or other outer shell 200 portions. As a result, mounting portion 500 and/or mounting blister 510 facilitates easier assembly, less wear, simpler repair as compared to known nacelle structures because rivets and fasteners can be easily inserted and/or removed to mount and/or replace wind turbine components provided within outer shell 200. Moreover, stamped mounting portion 500 and/or mounting blister 510 also facilitates providing the advantages discussed above with respect to increasing strength, disseminating stresses and loads, reducing vibration stresses, reducing a number of structural members, reducing an overall weight, and/or increasing surface area of outer shell 200 as compared to known nacelle structures.

After assembly of outer skin 200, a thicker and stiffer local portion of outer shell 200 may be desirable. In the exemplary embodiment, at least one separate sheet of material is stamped to form an additional nesting mounting portion 520. Nesting mounting portion 520 includes a channel 522 including a first wall 524 and a spaced, substantially parallel second wall 526. First and second walls 524 and 526 include outwardly extending flanges 528 and 530, respectively. Moreover, first and second walls 524 and 526 are joined by an intermediate wall 532 positioned therebetween. Further, intermediate wall 532 includes a plurality of mounting blisters 534 stamped into intermediate wall 532. It should be appreciated that nesting mounting portion 520 and/or mounting blisters 534 may vary in size, shape, and/or orientation without departing from the scope of the present application.

In the exemplary embodiment, nesting mounting portion 520 may be coupled to at least one of outer shell 200 and mounting portion 500 to facilitate reinforcing outer shell 200 locally. For example, nesting mounting portion 520 may be coupled to outer shell 200 via welding methods or providing fasteners (not shown) through openings 536 defined in nesting mounting portion 520 and/or opening defined in portions of outer shell 200. Subsequently, wind turbine components may be coupled to nesting mounting portion 520 via openings 538 defined in mounting blisters 534 and/or other areas of nesting mounting portion 520. As a result, outer shell portions may be partially reinforced to facilitate increasing localized material strength capable of withstanding localized environmental conditions. Because nesting mounting portion 520 facilitates increasing strength of stamped outer shell 200 at localized areas when desirable, reducing weight and costs of entire outer shell 200 is still facilitated as compared to some known nacelles.

In general, any combination of mounting portions as described herein may be formed into and/or used with outer shell 200 of monocoque nacelle 106 to attain predetermined operational parameters as also described herein.

The methods and apparatus for a wind turbine generator nacelle described herein facilitate operation of a wind turbine generator. More specifically, the wind turbine generator monocoque structure as described above facilitates an efficient and effective mechanical load and stress transfer scheme. Also, the lighter weight monocoque nacelle structure facilitates decreased capital construction costs. Such monocoque nacelle structure also facilitates wind turbine generator reliability, and reduced maintenance costs and wind turbine generator outages.

Exemplary embodiments of monocoque wind turbine nacelle structures as associated with wind turbine generators are described above in detail. The methods, apparatus and systems are not limited to the specific embodiments described herein nor to the specific illustrated wind turbine generators.

While the invention has been described in terms of various specific embodiments, those skilled in the art will recognize that the invention can be practiced with modification within the spirit and scope of the claims.

What is claimed is:

1. A method of assembling a rotary machine, said method comprising:
   providing at least one component, the component is at least one of a rotating member and a stationary member; and
   coupling the at least one component to a monocoque nacelle structure comprising an outer shell extending over at least a portion of the component further comprising stamping at least one sheet member to for at least one mounting portion in the outer shell.

2. A method according to claim 1 further comprising coupling a plurality of sheet members together by at least one of retention hardware and welding to form the outer shell, and coupling the component to the outer shell.

3. A method according to claim 1 wherein stamping at least one sheet member to form at least one mounting portion comprises stamping at least one channel within the outer shell.

4. A method according to claim 1 wherein stamping at least one sheet member to form at least one mounting portion comprises stamping a plurality of v-shaped channels within the outer shell.

5. A method according to claim 1 further comprising nesting the at least one mounting portion within a separate nesting mounting portion.

6. A wind turbine generator comprising:
   at least one component, said component comprises at least one of a rotating member and a stationary member; and
   a monocoque nacelle structure coupled to said component, said monocoque nacelle structure comprising an outer shell extending over at least a portion of said component.

7. A wind turbine generator according to claim 6 wherein said outer shell comprises a plurality of sheet members coupled together by at least one of retention hardware and welding, and wherein said component is coupled to said outer shell.

8. A wind turbine generator according to claim 6 further comprising at least one mounting portion stamped into at least one sheet member forming said outer shell.

9. A wind turbine generator according to claim 8 wherein said mounting portion comprises at least one channel.

10. A wind turbine generator according to claim 8 wherein said mounting portion comprises a plurality of v-shaped channels.

11. A wind turbine generator according to claim 8 further comprising a nesting mounting portion, said nesting mounting portion comprising a channel that nests said stamped mounting portion within said channel.

12. A wind turbine generator in accordance with claim 6 wherein said outer shell further comprises at least one dimple stamped into at least one sheet member forming said outer shell.

13. A monocoque nacelle for a rotary machine, said monocoque structure comprising:
  at least one component, said component comprises at least one of a rotating member and a stationary member; and
  an outer shell coupled to said component, said outer shell extending over at least a portion of said component, wherein said outer shell comprises a plurality of sheet members coupled together by at least one of retention hardware and welding.

14. A monocoque nacelle according to claim 13 further comprising at least one mounting portion stamped into at least one sheet member forming said outer shell.

15. A monocoque nacelle according to claim 14 wherein said mounting portion comprises at least one channel.

16. A monocoque nacelle according to claim 14 wherein said mounting portion comprises a plurality of v-shaped channels.

17. A monocoque nacelle according to claim 14 further comprising a nesting mounting portion, said nesting mounting portion comprising a channel that nests said stamped mounting portion within said channel.

18. A monocoque nacelle for a rotary machine, said monocoque structure comprising: at least one component, said component comprises at least one of a rotating member and a stationary member; and an outer shell coupled to said component, said outer shell extending over at least a portion of said component, wherein said outer shell further comprises at least one dimple stamped into at least one sheet member forming said outer shell.

* * * * *